United States Patent [19]

Yamamoto et al.

[11] 4,190,846
[45] Feb. 26, 1980

[54] INK LIQUID CONCENTRATION CONTROL IN AN INK LIQUID SUPPLY SYSTEM FOR AN INK JET SYSTEM PRINTER

[75] Inventors: Yoichi Yamamoto, Nara; Yoichi Shimazawa, Yamatokoriyama, both of Japan

[73] Assignee: Sharp Kabushiki Kaisha, Osaka, Japan

[21] Appl. No.: 857,973

[22] Filed: Dec. 6, 1977

[30] Foreign Application Priority Data

Dec. 6, 1976 [JP] Japan .............................. 51-147042

[51] Int. Cl.² ...................... G01D 15/18; G05D 11/00
[52] U.S. Cl. ................................. 346/140 R; 346/75; 137/92
[58] Field of Search ...................... 346/75, 140; 137/92

[56] References Cited
U.S. PATENT DOCUMENTS

| | | | |
|---|---|---|---|
| 2,998,019 | 8/1961 | Adelson | 137/92 |
| 3,761,953 | 9/1973 | Halgeson et al. | 346/75 |
| 3,771,568 | 11/1973 | Bischoff et al. | 346/140 X |

OTHER PUBLICATIONS

Cralle, W. O. Jr., Ink Dilution Control by Osmosis, IBM Technical Disclosure Bulletin, Sep. 1974, vol. 17, No. 4, p. 1108.
Garwin, R. L., Compensating Evaporation of Water From Recirculating Inks, IBM Technical Disclosure Bulletin, Jul. 1975, vol. 18, No. 2, pp. 606–607.

*Primary Examiner*—George H. Miller, Jr.
*Attorney, Agent, or Firm*—Birch, Stewart, Kolasch & Birch

[57] ABSTRACT

An ink liquid concentration controller is provided in an ink liquid supply system for an ink jet system printer to ensure a stable printing operation. The ink liquid concentration controller functions to maintain the concentration of the ink liquid at a constant value by supplying a volatile dilution to the ink liquid introduced into the ink liquid concentration controller.

8 Claims, 5 Drawing Figures

INK LIQUID CONCENTRATION CONTROL IN AN INK LIQUID SUPPLY SYSTEM FOR AN INK JET SYSTEM PRINTER

BACKGROUND OF THE INVENTION

The present invention relates to an ink liquid supply system for an ink jet system printer and, more particularly, to an ink liquid supply system which holds the concentration of the ink liquid at a constant value.

In general, in an ink jet system printer, ink droplets from a nozzle are issued toward a recording paper, and then desired ink droplets are deflected in a desired direction when they pass through an appropriate deflection means. The deflected ink droplets are deposited on the recording paper in order to record desired symbols corresponding to printing information supplied. In an ink jet system printer of the charge amplitude controlling type wherein an ink stream from a nozzle having an ultrasonic vibrator is broken into ink droplets at a given vibration frequency, and the individual ink droplets, being charged by a charging electrode in accordance with printing information, are deflected in accordance with the amplitude of charges carried thereon as they pass through an electrostatic field of a fixed high voltage thereby printing desired symbols such as alphabet characters, it is especially important that the application of charging signals is accurately timed to be in agreement with the droplet separation phase. Therefore, it is necessary to hold the pedetermined phase relationship between the droplet separation and the ultrasonic vibration substantially constant. In the ink jet system printer of the charge amplitude controlling type, the ink droplets are always emitted from the nozzle while the ink jet system printer is in the operative condition. The ink droplets not utilized in the writing operation are neither charged nor deflected and are directed to a beam gutter in order to recirculate the waste ink liquid to an ink liquid reservoir. The thus recirculated ink liquid has a high concentration, since a portion of the volatile component of the ink liquid volatilizes while the ink droplets travel through the air from the nozzle to the beam gutter. Accordingly, the concentration of the ink liquid contained in the ink liquid supply system gradually increases during the operation of the ink jet system printer.

The increase of the ink liquid concentration will create variations of the print quality, and will vary the drop formation phase. This is not preferable for the ink jet system printer of the charge amplitude controlling type, because the phase relationship between the droplet separation and the ultrasonic vibration must be maintained constant in this type of ink jet system printer.

OBJECTS AND SUMMARY OF THE INVENTION

Accordingly, an object of the present invention is to provide an ink liquid supply system for an ink jet system printer which ensures stable operation of the ink jet system printer.

Another object of the present invention is to maintain the concentration of the ink liquid contained in an ink liquid supply system at a constant value.

Still another object of the present invention is to provide an ink liquid concentration controller in an ink liquid supply system for an ink jet system printer for holding the ink liquid concentration constant.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an ink liquid concentration controller is provided in an ink liquid supply system which functions to add a volatile dilution to the ink liquid in order to hold the ink liquid concentration constant. In a preferred form, the ink liquid concentration controller comprises a semipermeable membrane which separates the ink liquid of which the concentration is to be held constant from a reference ink liquid having a predetermined concentration. When the concentration of the ink liquid to be applied to the nozzle increases, the volatile dilution is applied from the reference ink liquid to the ink liquid to be supplied to the nozzle through the semipermeable membrane. The reference ink liquid receives the volatile dilution from a dilution cartridge in an amount corresponding to the supply amount from the reference ink liquid to the ink liquid to be applied to the nozzle.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
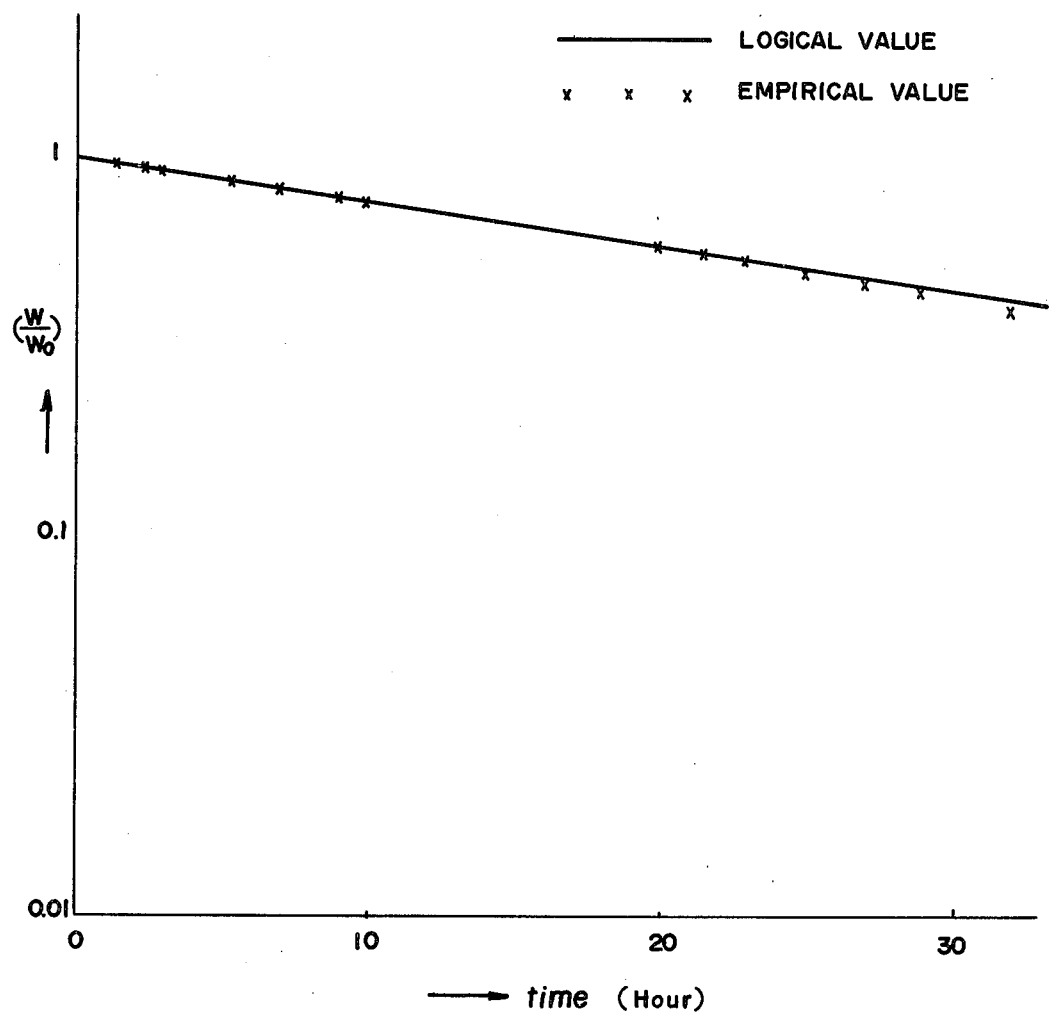
FIG. 1 is a graph showing the reduction of ink liquid due to volatilization of a volatile component included within the ink liquid.

Referring now in detail to the drawings, and to facilitate a more complete understanding of the present invention, the characteristics of the ink liquid used in the ink jet system printer of the present invention will be first described with reference to FIGS. 1 and 2.

The following three operation states can be considered when an ink jet system printer is power supplied.

(1) STAND BY:

The ink jet system printer is ready to conduct print operation and is waiting print command information.

(2) INTERMITTENT MODE:

The print operation is intermittently conducted in response to information introduced from a keyboard.

(3) CONTINUOUS MODE:

The print operation is continuously conducted in response to information derived from an information source discrete from the ink jet system printer.

In the "STAND BY" mode, all of the ink droplets emitted from the nozzle are collected by a beam gutter for recirculation purposes. The volatile component included within the ink liquid is reduced due to volatilization, while the non-volatile component included within the ink liquid is not reduced at all.

In the "INTERMITTENT MODE", the non-volatile component included within the ink liquid is reduced a little, while the volatile component included within the ink liquid reduced to a greater extent. The ink liquid reduction condition in the "INTERMITTENT MODE" is similar to that in the "STAND BY" mode.

In the "CONTINUOUS MODE", a lot of ink liquid is used for performing a writing operation and, therefore, the concentration of the ink liquid contained in the ink liquid supply system does not vary very much.

The above-mentioned three states can be summarized as follows:

(I) The volatile component in the ink liquid is reduced due to volatilization, while the non-volatile component in the ink liquid is not reduced. This condition relates to the "STAND BY" mode and the "INTERMITTENT MODE".

(II) The volatile component and the non-volatile component in the ink liquid are reduced by the actual writing operation. This condition relates to the "CONTINUOUS MODE".

The total amount of the ink liquid contained in the ink liquid supply system is always maintained at a constant value. That is, the ink liquid supply system receives the ink liquid from an ink liquid cartridge by an amount corresponding to the reduction of the ink liquid contained in the ink liquid supply system.

The volatilizing velocity of the volatile component included within the ink liquid is proportional to the amount of the volatile component included within the ink liquid when the temperature and the humidity are held constant.

An amount W of the volatile component can be expressed as follows when the existing rate of the volatile component is x and the total amount of the ink liquid is V.

$$W = Vx \quad (1)$$

A volatilizing amount $Q_1 \Delta t$ during a time period of $\Delta t$ can be expressed as follows:

$$Q_1 \Delta t = Vxa\Delta t \quad (2)$$

That is, the following equations can be derived from the equation (2) when the attention is directed to the volatile component.

$$V(t+\Delta t)x(t+\Delta t) = V(t)x(t) - V(t)x(t)a\Delta t \quad (3)$$

or $$W(t+\Delta t) = W(t) - W(t)a\Delta t \quad (4)$$

The following differential equation can be derived at the limit $\Delta t \to 0$.

$$dw/dt = -aW \quad (5)$$

The following equation can be derived from the differential equation (5) when the initial condition is as follows:

$W = W_0$ at $t=0$ $$W = W_0 \exp(-at) \quad (6)$$

It will be clear from FIG. 1 that the volatile component is reduced as an exponential function. That is, the proportional constant a of volatilization can be determined.

Now assume the condition (I), wherein the ink droplets are continuously emitted from the nozzle and all of the ink droplets emitted from the nozzle are collected by the beam gutter. The volatile component is reduced but the non-volatile component is not reduced at all.

When the ink liquid amount emitted from the nozzle per unit time length is Qcc, the reduction of the volatile component during a time period $\Delta t$ is $Q\Delta txb$, where x is the existing ratio of the volatile component at a time t, and b is the proportional constant of volatilization. When the ink liquid is added to the system by the amount corresponding to the above calculated reduction, the following equation can be provided for the volatile component.

$$Vx(t+\Delta t) = Vx(t) - Q\Delta tx(t)b + Q\Delta tx(t)bx_o \quad (7)$$

Accordingly, $$dx/dt = -Q/V(1-x_o)bx(t) \quad (8)$$

The following equation can be derived from the differential equation (8) when $x = x_o$ at $t = 0$.

$$x/x_o = \exp\{-Q/V(1-x_o)bt\} \quad (9)$$

In the actual system, Q=3.8 cc/min. where the nozzle diameter is 65 $\mu m\phi$, and the ink liquid pressure is 2.8 kg/cm$^2$. The amount V of the ink liquid contained in the ink liquid supply system is 200 cc, and the existing ratio $x_o$ of the volatile component in the ink liquid supplied from the ink cartridge is 0.85.

Figure 2:
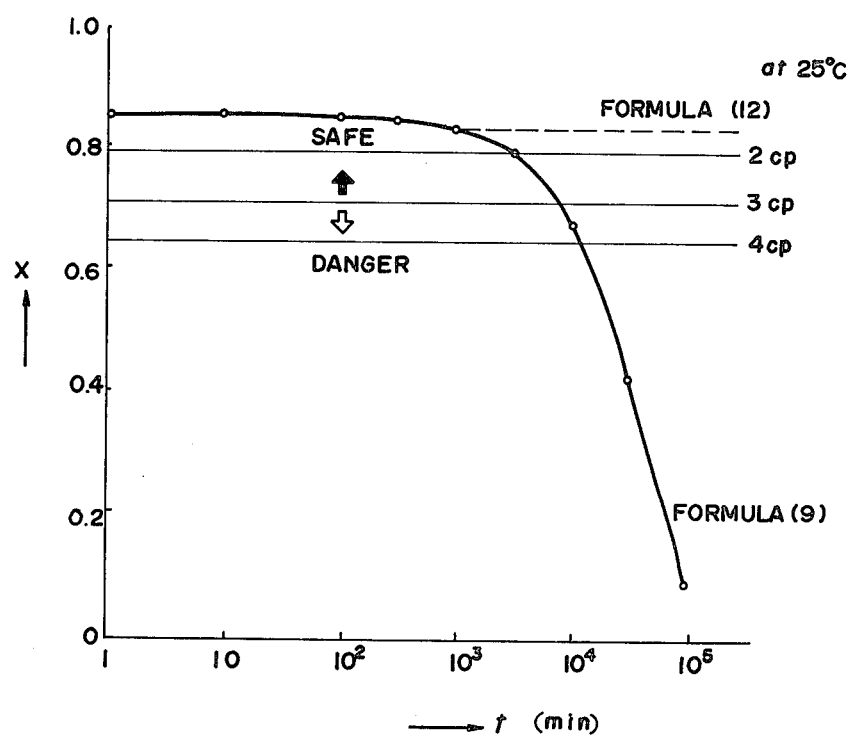
FIG. 2 is a graph showing the reduction of the volatile component included within the ink liquid.

The graph of FIG. 2 is derived from the equation (9) by substituting the above-mentioned actual values into the equation (9). The safe limit of the viscosity for ensuring an accurate print operation is three centipoises (3 cp.). That is, the printer can not work accurately after the expiration of approximately one hundred (100) hours.

Now assume the condition (II), wherein the non-volatile component and the volatile component are reduced by the actual writing operation, and new ink liquid is supplied from the ink liquid cartridge to the ink liquid supply system by an amount corresponding to the reduction of the ink liquid. The amount of the volatile component included within the ink liquid can be expressed by the following formula after the expiration of a time period $\Delta t$.

$$Vx(t+\Delta t) = Vx(t) - (Q-Q_2)\Delta tx(t)b + (Q-Q_2)\Delta tx(t)bx_o - Q_2X(t)\Delta t + Q_2X_o\Delta T \quad (10)$$

The following differential equation is obtained at the limit $\Delta t \to 0$.

$$\frac{dx}{dt} = -\left\{\frac{(Q-Q_2)b(1-x_2)}{V} + \frac{Q_2}{V}\right\}x + \frac{Q_2x_o}{V} \quad (11)$$

The amount of the volatile component included within the ink liquid contained in the ink liquid supply system at a time t can be expressed as follows:

$$x = (x_o - \frac{B}{A}) \exp(-At) + \frac{B}{A} \quad (12)$$

$$A = \frac{(Q - Q_2)b(1 - x_o)}{V} + \frac{Q_2}{V} \quad (13)$$

$$B = \frac{Q_2 x_o}{V} \quad (14)$$

If $Q_2$ represents the reduction amount of the ink liquid per unit time period. When the alpha-numerical characters are printed in a 5×7 dot matrix pattern, the mean value of the reduction amount $Q_2$ of the ink liquid in the "CONTINUOUS MODE" is as follows:

$Q_2 = 0.197$ cc/min.

When the actual values described in the condition (I) are introduced into the equation (12), the equation (12) can be expressed as shown by the broken line in FIG. 2. That is, in the "CONTINUOUS MODE", the existing ratio of the volatile component converges.

$x_\infty = 0.83$

Therefore, when the ink jet system printer always operates in the "CONTINUOUS MODE", there is no possibility that the viscosity of the ink liquid increases to a dangerous region.

However, in the actual system, the ink jet system printer is usually placed in the condition (I). Accordingly, a novel ink liquid supply system is required, which can hold the concentration of the ink liquid constant.

Figure 3:
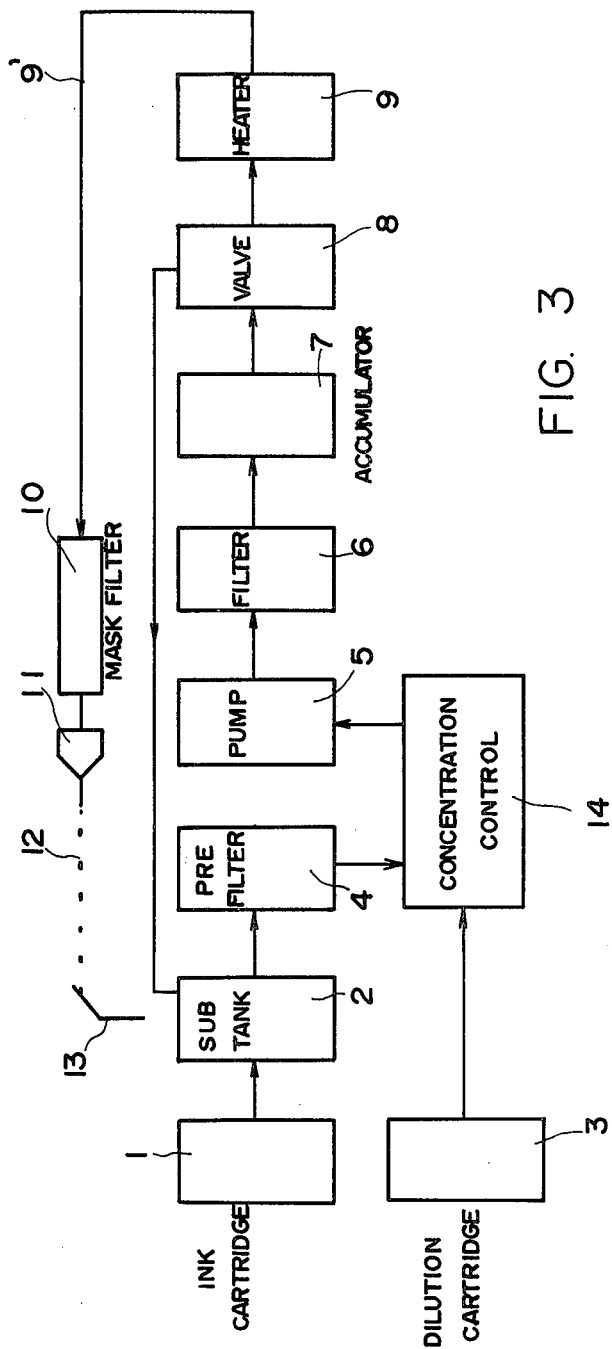
FIG. 3 is a schematic block diagram of an embodiment of an ink liquid supply system of the present invention including an ink liquid concentration controller.

FIG. 3 shows an embodiment of the ink liquid supply system of the present invention.

An ink liquid cartridge 1 functions to supply a subtank 2 with ink liquid, the amount supplied is equal to the reduced amount of the ink liquid in the ink liquid supply system. The subtank 2 is connected to receive ink liquid not only from the ink liquid cartridge 1 but also from a beam gutter 13 and an electromagnetic cross valve 8. A prefilter 4 is provided for removing impurities such as dust included within the waste ink liquid collected by the beam gutter 13.

An ink liquid concentration controller 14 is disposed between the prefilter 4 and a pump 5. The ink liquid supplied from the prefilter 4 has a relatively high concentration since a portion of the volatile component of the ink liquid collected by the beam gutter 13 has volatilized while ink droplets 12 travel from a nozzle 11 to the beam gutter 13. The ink liquid concentration controller 14 functions to add a volatile dilution from a reference ink liquid through a semipermeable membrane to the ink liquid supplied from the prefilter 4 so as to hold the concentration of the ink liquid in the ink liquid supply system constant. The reduction of the volatile dilution in the reference ink liquid is detected as the reduction of the ink liquid level of the reference ink liquid. The reference ink liquid receives the volatile dilution from a dilution cartridge 3 by the amount corresponding to the amount of the volatile dilution supplied from the reference ink liquid to the ink liquid to be supplied to the nozzle 11. That is, the concentration of the reference ink liquid is held constant.

The thus controlled ink liquid having a predetermined concentration is supplied from the ink liquid concentration controller 14 to the pump 5, which functions to supply the ink liquid to the nozzle 11 under a predetermined pressure. The ink liquid delivered from the pump 5 is supplied through a filter 6 to an accumulator 7 which functions to accumulate the ink liquid pressure and to remove the pressure pulsation caused by the pump 5.

The electromagnetic cross valve 8 is provided for ensuring rapid initiation and rapid termination of the issuance of the ink droplets 12 from the nozzle 11. At a time when the ink droplet issuance is initiated, the ink liquid pressure accumulated in the accumulator 7 is applied to the nozzle 11 through the electromagnetic cross valve 8. At a time when the ink droplet issuance is terminated, the electromagnetic cross valve 8 functions to return the excess ink liquid to the subtank 2 and to maintain the ink liquid pressure in the accumulator 7.

A heater 9 functions to maintain the ink liquid temperature at a constant value to ensure stable operation of the ink jet system printer. An example of the heater 9 is disclosed in U.S. Pat. No. 4,007,684 entitled "INK LIQUID WARMER FOR INK JET SYSTEM PRINTER" on Feb. 15, 1977. A mask filter 10 is attached to the nozzle 11. The mask filter 10 and the nozzle 11 are detachable from a flexible conduit 9′. The mask filter 10 functions to prevent the nozzle 11 from being blocked by impurities which will be introduced into the system when the nozzle 11 and the mask filter 10 are exchanged.

Figure 4:
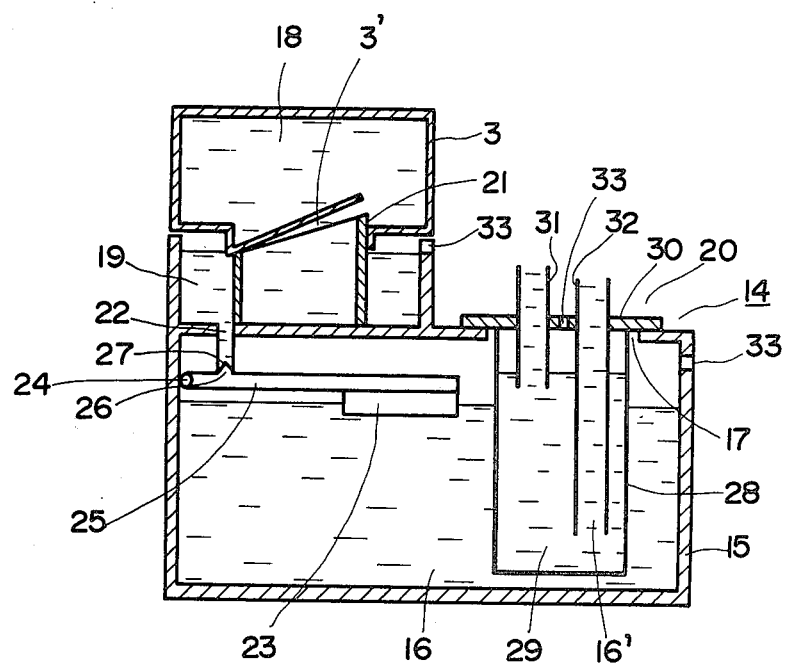
FIG. 4 is a sectional view of an embodiment of the ink liquid concentration controller included within the ink liquid supply system of FIG. 3.

FIG. 4 shows an embodiment of the ink liquid concentration controller 14.

The ink liquid concentration controller 14 mainly comprises a concentration controlling tank 15 for containing reference ink 16 therein. The concentration controlling tank 15 has an opening 17 formed in the upper wall of the tank 15. A semipermeable membrane unit 20 is removably disposed through the opening 17. The concentration controlling tank 15 includes a volatile component reservoir 19 for containing a volatile dilution 18 therein. The volatile component reservoir 19 has a cartridge cutter 21 for opening a cap 3′ of the dilution cartridge 3 when the dilution cartridge 3 is disposed on the volatile component reservoir 19.

A conduit 22 is provided for connecting the volatile component reservoir 19 to the interior of the concentration controlling tank 15 so as to hold the concentration of the reference ink 16 constant. A valve member 26 is secured to an arm 25, which is rotatable around a fulcrum 24. A float 23 is fixed to the free end of the arm 25. The valve member 26 is associated with a valve seat 27 which is secured to the end of the conduit 22. The valve member 26 is normally forced to contact with the valve seat 27 so that the concentration controlling tank 15 is not communicated with the volatile component reservoir 19 in the normal condition.

When the volume of the volatile component included within the reference ink 16 is reduced, the float 23 travels downward to separate the valve member 26 from the valve seat 27. The volatile dilution 18 contained in the volatile component reservoir 19 is supplied to the concentration controlling tank 15. The valve is closed when the liquid level in the concentration controlling tank 15 reaches a predetermined value. In this way, the concentration of the reference ink 16 contained in the concentration controlling tank 15 is maintained at a constant value.

The semipermeable membrane unit 20 mainly comprises a semipermeable membrane 28 such as cellophane determining an ink reservoir 29. The semipermeable membrane 28 is fixed to a plate 30 through which an input conduit 31 and an output conduit 32 are provided.

The ink reservoir 29 is dipped into the reference ink 16 contained in the concentration controlling tank 15.

The input conduit 31 functions to introduce ink liquid 16' of which the concentration is controlled by the prefilter 4, and the output conduit 32 functions to supply the pump 5 with the ink liquid 16' of which the concentration is controlled. The ink liquid 16' supplied to the pump 5 has the concentration identical with that of the reference ink 16. The reference numeral 33 designates an opening for communicating the interior of the concentration controlling tank 15 with the ambience.

When the ink liquid 16' introduced into the ink reservoir 29 has a concentration higher than that of the reference ink 16, the volatile component flows from the reference ink 16 to the ink liquid 16' through the semipermeable membrane 28. The flow of the volatile component continues until the concentration of the ink liquid 16' becomes identical with that of the reference ink 16.

The above-mentioned flow of the volatile component reduces the ink liquid amount of the reference ink 16 contained in the concentration controlling tank 15. Therefore, the volatile component 18 is supplied from the volatile component reservoir 19 to the reference ink 16 through the valve seat 27 and the valve member 26. That is, the amount of the reference ink 16 and the concentration of the reference ink 16 are always maintained at predetermined values.

Figure 5:
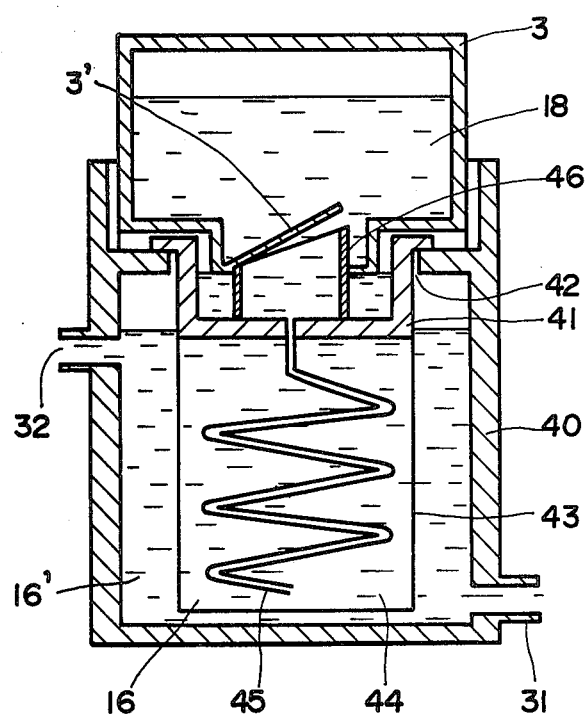
FIG. 5 is a sectional view of another embodiment of the ink liquid concentration controller included within the ink liquid supply system of FIG. 3.

FIG. 5 shows another embodiment of the ink liquid concentration controller 14. Like elements corresponding to those of FIG. 4 are indicated by like numerals.

A semipermeable membrane unit 41 is removably disposed within a concentration controlling tank 40 through an opening 42. The semipermeable membrane unit 41 mainly comprises a semipermeable membrane 43 determining an ink reservoir 44 for securing the reference ink 16 therein. A spiral conduit 45 is disposed within the ink reservoir 44, and introduces the volatile component 18 into the ink reservoir 44. The semipermeable membrane unit 41 includes a cutter 46 for opening the cap 3' of the volatile dilution cartridge 3. The volatile component 18 is supplied from the volatile dilution cartridge 3 to the ink reservoir 44 through the spiral conduit 45 so that the reference ink 16 is always filled in the ink reservoir 44. Operation of the ink liquid concentration controller of FIG. 5 is similar to that of FIG. 4.

The invention being thus described, it will be obvious that the same may be varied in many ways. Such variations are not to be regarded as a departure from the spirit and scope of the invention, and all such modifications are intended to be included within the scope of the following claims

What is claimed is:

1. An ink liquid supply system for an ink jet system printer which emits ink droplets from a nozzle for performing a writing operation, said ink liquid supply system comprising:
    an ink tank for containing ink liquid therein;
    conduit means for connecting said ink tank with said nozzle;
    a pump for supplying the ink liquid from said ink tank to said nozzle through said conduit means under a predetermined pressure; and
    an ink liquid concentration controller disposed between said ink tank and said pump, said ink liquid concentration controller including:
        a first reservoir for containing reference ink of a predetermined concentration therein;
        a second reservoir for introducing ink liquid from said ink tank and for supplying ink liquid to said pump; and
        means for maintaining the concentration of the ink liquid in said second reservoir at a value identical with that of the reference ink in said first reservoir.

2. The ink liquid supply system according to claim 1, wherein ink droplets emitted from said nozzle but not contributive to the writing operation are collected by a beam gutter and introduced into said ink tank.

3. An ink liquid supply system according to claim 1, wherein said means for maintaining the concentration of the ink liquid is a semipermeable membrane for separating the first reservoir from said second reservoir, said semipermeable membrane permits the flow of volatile dilution of the ink liquid therethrough.

4. The ink liquid supply system according to claim 3, wherein said ink liquid concentration controller further comprises a volatile dilution reservoir for supplying said first reservoir with said volatile dilution in such a manner that the amount of said reference ink contained in said first reservoir is held constant.

5. An ink liquid supply system for an ink jet system printer which emits ink droplets from a nozzle for performing a writing operation, said ink liquid supply system being provided with an ink liquid reservoir for containing ink liquid therein, conduit means for connecting said ink liquid reservoir with said nozzle, and supply means for supplying the ink liquid through said conduit means to said nozzle, said ink liquid supply system further including:
    an ink liquid concentration controller for holding the concentration of the ink liquid to be supplied to the nozzle constant, said ink liquid concentration controller comprising:
        a first reservoir for containing reference ink of a predetermined concentration therein;
        a second reservoir for containing the ink liquid to be supplied to the nozzle therein; and
        means for equalizing the concentration of the ink liquid contained in said second reservoir with that of the ink liquid contained in said first reservoir.

6. The ink liquid supply system according to claim 5, wherein said ink liquid concentration controller is disposed between said ink liquid reservoir and said supply means.

7. An ink liquid supply system according to claim 5, wherein said means for equalizing the concentration of the ink liquid is a semipermeable membrane for separating the first reservoir from said second reservoir, said semipermeable membrane permits the flow of volatile dilution of the ink liquid therethrough.

8. The ink liquid supply system according to claim 7, wherein said ink liquid concentration controller further comprises a volatile dilution reservoir for supplying said first reservoir with said volatile dilution in such a manner that the amount of said reference ink contained in said first reservoir is held constant.

* * * * *